US011913798B2

(12) United States Patent
Trimboli et al.

(10) Patent No.: US 11,913,798 B2
(45) Date of Patent: Feb. 27, 2024

(54) OPTIMIZATION OF CHARGING PROFILES FOR AN ELECTRIC VEHICLE

(71) Applicant: GM GLOBAL TECHNOLOGY OPERATIONS LLC, Detroit, MI (US)

(72) Inventors: Brian Trimboli, Rochester Hills, MI (US); Matthew A. Thomas, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 17/692,586

(22) Filed: Mar. 11, 2022

(65) Prior Publication Data
US 2023/0288216 A1  Sep. 14, 2023

(51) Int. Cl.
*G01C 21/34* (2006.01)
*B60L 53/63* (2019.01)
*B60L 53/62* (2019.01)

(52) U.S. Cl.
CPC .......... *G01C 21/3476* (2013.01); *B60L 53/62* (2019.02); *B60L 53/63* (2019.02)

(58) Field of Classification Search
CPC ...... G01C 21/3476; B60L 53/62; B60L 53/63
See application file for complete search history.

(56) References Cited

U.S. PATENT DOCUMENTS 11,605,964 B1 * 3/2023 Palombini ........... H02J 7/00032
2022/0228877 A1 * 7/2022 Feldman ................. B60L 53/65

* cited by examiner

*Primary Examiner* — Jaime Figueroa
*Assistant Examiner* — Jamal A Shah
(74) *Attorney, Agent, or Firm* — Quinn IP Law

(57) ABSTRACT

A system for optimizing charging for a vehicle having a rechargeable energy storage unit and travelling on a route includes a controller. The controller has a processor and tangible, non-transitory memory on which instructions are recorded. Execution of the instructions by the processor causes the controller to obtain details of the route, including surveying local charging infrastructure to determine availability of one or more charging stations within a predefined radius of the route. The controller is adapted to obtain respective station parameters pertaining to the one or more charging stations. Based on user input, at least one session goal is selected from a predefined set of goals. The controller is adapted to generate a recommended charging profile respectively for one or more stops along the route, based in part on the session goal and the respective station parameters.

20 Claims, 3 Drawing Sheets

OPTIMIZATION OF CHARGING PROFILES FOR AN ELECTRIC VEHICLE

INTRODUCTION

The present disclosure relates to optimization of charging profiles for a rechargeable energy storage unit in a vehicle. The use of purely electric vehicles and hybrid vehicles, such as battery electric vehicles, window extended electric vehicles, hybrid electric vehicles, plug-in hybrid electric vehicles and fuel cell hybrid electric vehicles, has increased over the last few years. Hybrid electric vehicles and purely electric vehicles generally include a rechargeable energy storage unit, such as a high voltage battery having a number of battery cells, which requires periodic recharging. Optimizing the charging profiles is a non-trivial issue due to trade-offs resulting from manipulating the different charging metrics. For example, increasing current in a charging profile speeds up the process, however, this causes heat build-up and greater energy spent to cool the battery.

SUMMARY

Disclosed herein is a system for optimizing charging for a vehicle having a rechargeable energy storage unit. The system includes a controller having a processor and tangible, non-transitory memory on which instructions are recorded. Execution of the instructions by the processor causes the controller to obtain details of the route, including surveying local charging infrastructure to determine availability of one or more charging stations within a predefined radius of the route. The controller is adapted to obtain respective station parameters pertaining to the one or more charging stations. Based on user input, at least one session goal is selected from a predefined set of goals. The controller is adapted to generate a recommended charging profile for one or more stops respectively along the route, based in part on the session goal and the respective station parameters.

The respective station parameters may include usage volume and costs incurred at the one or more charging stations. The respective station parameters may include presence of brown-out conditions at the one or more charging stations. The predefined set of goals may include charging time minimization and cost minimization. The user may be prompted to select a respective percentage for each of the predefined set of goals. The controller may execute a machine learning module to generate the recommended charging profile. In some embodiments, the controller is configured to continuously monitor the local charging infrastructure to update the recommended charging profile while the vehicle is on the route.

The recommended charging profile is chosen from a plurality of charging profiles. In some embodiments, the controller may be adapted to compare respective energy gained by the rechargeable energy storage unit during various charging periods of the plurality of charging profiles. The various charging periods may include a first charging period of 10 minutes, a second charging period of 20 minutes and a third charging period of 30 minutes. The controller may be adapted to compare respective time taken for a rechargeable energy storage unit in the vehicle to reach various charge states for the plurality of charging profiles. The various charge states may include a first charge state of 80% SOC, a second charge state of 90% SOC and a third charge state of 96% SOC.

Disclosed herein is a method for optimizing charging for a vehicle having a rechargeable energy storage unit and travelling on a route, the vehicle having a controller with a processor and tangible, non-transitory memory. The method includes obtaining details of the route, including surveying local charging infrastructure to determine availability of one or more charging stations within a predefined radius of the route and obtaining respective station parameters pertaining to the one or more charging stations, via the controller. At least one session goal is selected from a predefined set of goals based on user input, via the controller. The method includes generating a recommended charging profile for one or more stops respectively along the route, based in part on the session goal and the respective station parameters, via the controller.

The above features and advantages and other features and advantages of the present disclosure are readily apparent from the following detailed description of the best modes for carrying out the disclosure when taken in connection with the accompanying drawings.

Figure 1:
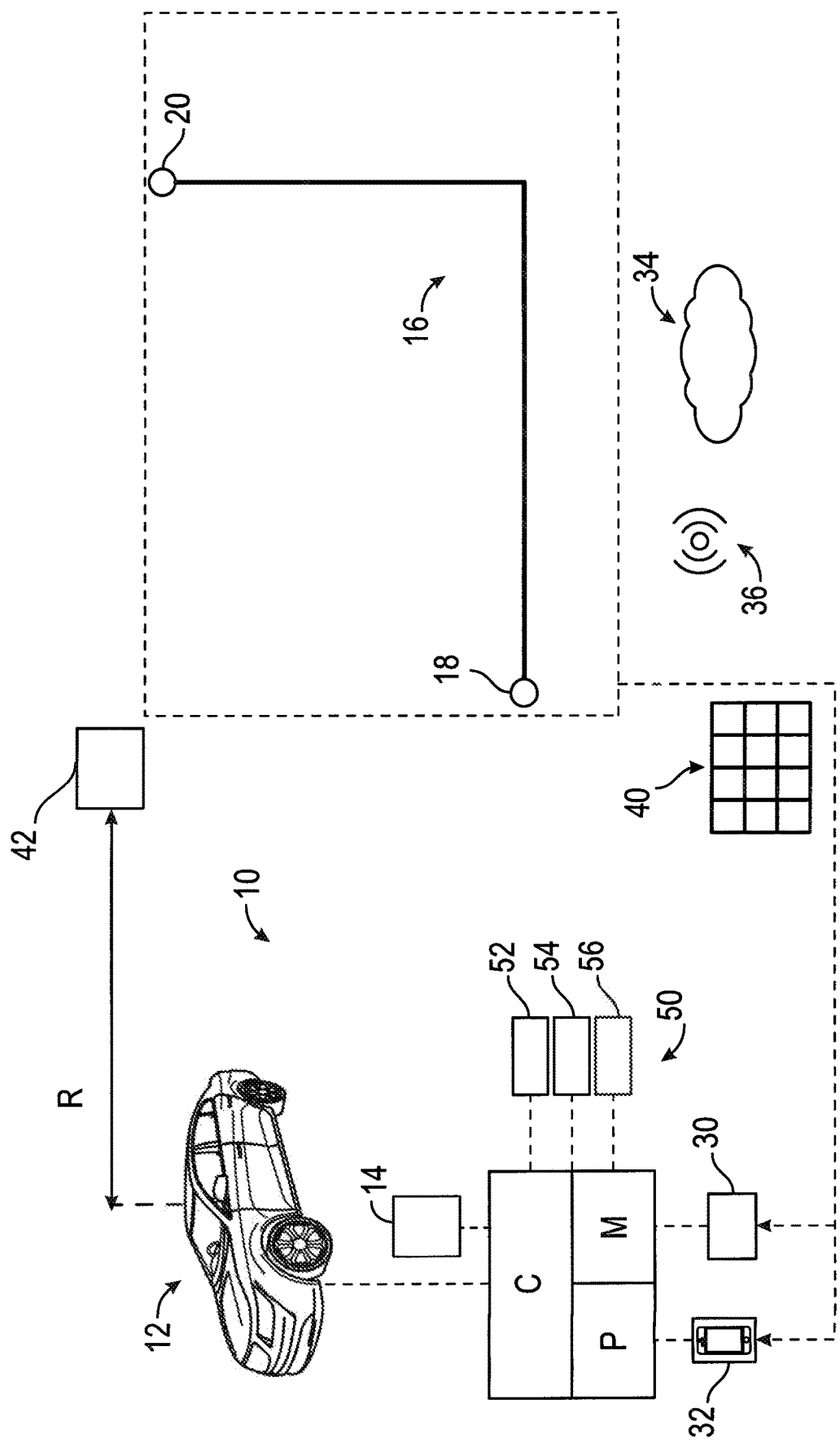
FIG. 1 is a schematic diagram of a system for optimizing charging in an electric vehicle having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for optimizing charging in a vehicle 12. The vehicle 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The vehicle 12 may be an electric vehicle, which may be purely electric or hybrid/partially electric. It is to be understood that the vehicle 12 may take many different forms and have additional components.

Referring to FIG. 1, the vehicle 12 includes a rechargeable energy storage unit 14, such as a high voltage battery having a number of battery cells. The rechargeable energy storage unit 14 may include battery cells of different chemistries, including not limited to, lithium-ion, lithium-iron, nickel metal hydride and lead acid batteries. The vehicle 12 may include an additional power source (not shown), such as but not limited to, an internal combustible engine or a fuel cell.

Referring to FIG. 1, the system 10 includes a controller C having at least one processor P and at least one memory M (or non-transitory, tangible computer readable storage medium) on which instructions may be recorded for executing a method 100 (described below with respect to FIG. 2). The memory M can store controller-executable instruction sets, and the processor P can execute the controller-executable instruction sets stored in the memory M.

The system 10 provides the opportunity to optimize each charge session individually based on a selected goal. The system 10 (via execution of method 100) generates a recommended charging profile for the rechargeable energy storage unit 14 for one or more stops of the vehicle 12 along a route. An example route 16 is shown in FIG. 1, beginning at origin 18 and ending at destination 20. Given a specific route 16, the user is presented with a recommended charging profile. Prior to the drive, the route 16 may be planned and characterized in terms of static and real time features.

Referring to FIG. 1, the vehicle 12 may include a communications interface 30 that is accessible to a user or operator of the vehicle 12, for example, to enter the origin 18, destination 20 and other navigation details. The communications interface 30 may include a touchscreen or other IO device and may be integrated in the infotainment unit of the vehicle 12. In some embodiments, the desired route may be entered by the user through a mobile application 32 that is in communication with the controller C. For example, the mobile application 32 may be physically connected (e.g., wired) to the controller C as part of the vehicle infotainment unit. The mobile application 32 may be embedded in a smart phone belonging to a user of the vehicle 12 and plugged or otherwise linked to the vehicle 12. The circuitry and components of a mobile application 32 ("apps") available to those skilled in the art may be employed. The communications interface 30 may also be employed for vehicle-to-vehicle (V2V) communication and/or a vehicle-to-everything (V2X) communication.

The controller C may access data or information from a remotely located or "off-board" cloud computing service, referred to herein as cloud unit 34. The cloud unit 34 may include one or more servers hosted on the Internet to store, manage, and process data, maintained by an organization, such as for example, a research institute or a company. Referring to FIG. 1, the controller C may be configured to communicate with the cloud unit 34 via a wireless network 36. The wireless network 36 of FIG. 1 may be a short-range network or a long-range network. The wireless network 36 may be a communication BUS, which may be in the form of a serial Controller Area Network (CAN-BUS). The wireless network 36 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Figure 2:
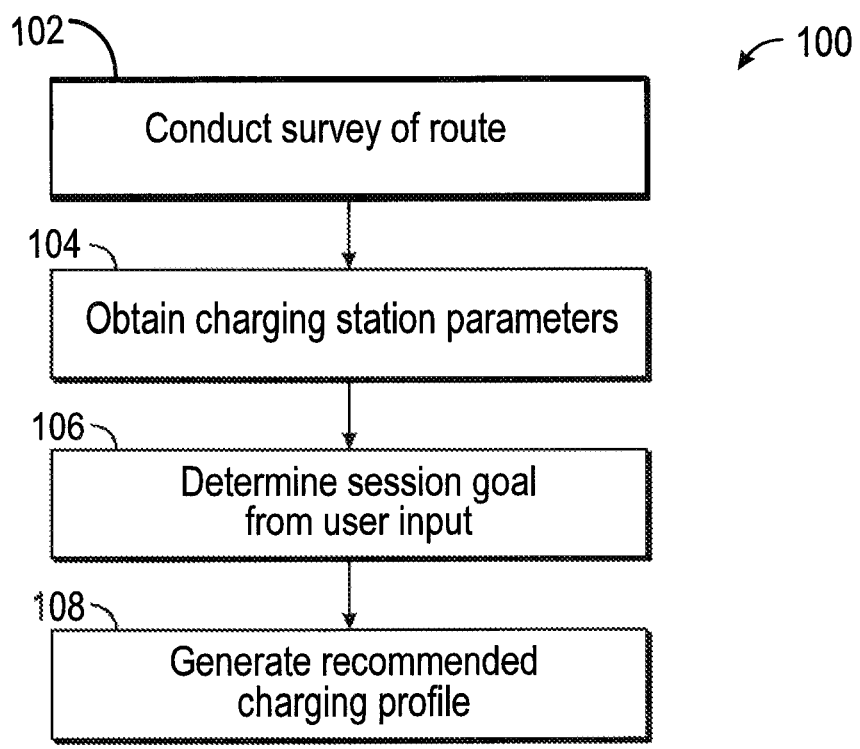
FIG. 2 is a schematic flow diagram of a method for optimizing charging in electric vehicle.

Referring now to FIG. 2, a flowchart of the method 100 stored on and executable by the controller C of FIG. 1 is shown. Method 100 may be embodied as computer-readable code or instructions stored on and partially executable by the controller C of FIG. 1. Method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 2, the method 100 includes obtaining details pertaining to the route 16, including conducting a survey of local charging infrastructure 40 (see FIG. 1). The controller C is programmed to determine availability of one or more charging stations 42 within a predefined radius R of the vehicle 12 along the route 16.

Advancing to block 104 of FIG. 2, the method 100 includes obtaining respective station parameters pertaining to the charging stations 42 that are within the predefined radius R of the vehicle 12 along the route 16 (see FIG. 1). The respective station parameters include usage volume (e.g., 50% capacity, 90% capacity) and costs incurred (per session) at each of the charging stations 42. The respective station parameters may include the presence of brown-out conditions (a reduction in or restriction on the availability of electrical power in a particular area) at the charging stations 42. The respective station parameters may include other infrastructure-based settings, such as a limitation to 30 minutes of charging based on a high volume of station need imposed by the charging stations 42, or other high use grid-based adjustments.

Proceeding to block 106 of FIG. 2, the method 100 includes determining at least one session goal (from a predefined set of goals 50) based on user input. The user is presented (e.g., via the communications interface 30 or the mobile application 32) a set of goals 50 and asked for input, i.e., select one or more session goals. Referring to FIG. 1, the set of goals 50 may include a first session goal 52 of minimizing cost, a second session goal 54 of minimizing charging time to full and a third session goal 56 of the maximum range added within a specific time limit. Other goals may be included. In some embodiments, the user may be asked to enter a percentage for each of the session goals. If the first session goal 52 is solely elected by the user, the percentages would be (100%, 0, 0). If the user selects equal proportions of the first session goal 52 and the second session goal 54, the percentages would be (50%, 50%, 0). In some embodiments, the session goal/scenario selections may be made by the controller C to notify the user of the recommendation and seek acceptance or acknowledgment. This embodiment may be useful, for example, where there is a single charging station option within the predefined radius R of the route 16.

Advancing to block 108 of FIG. 2, the method 100 includes generating a recommended charging profile respectively for one or more stops along the route 16, based in part on the session goal(s) (selected in block 106) and the respective station parameters (obtained in block 104). The recommended charging profile is chosen from a plurality of charging profiles. For example, the controller C may recommend a first stop (a ten-minute charging session in a first charging location) with a corresponding recommended charging profile and a second stop (thirty-minute charging session in a second charging location) with a corresponding recommended charging profile.

In some embodiments, the controller C may be adapted to compare the respective energy gained by the rechargeable energy storage unit 14 during various charging periods of the charging profiles. Table 1 below shows example values of energy gained (cumulative) in kilowatt hours by the rechargeable energy storage unit 14 during various charging periods of five different charging profiles. The various charging periods here are 10 minutes, 20 minutes and 30 minutes. The first charging profile, second charging profile and third charging profile are defined to respectively provide 300 Amperes, 350 Amperes and 400 Amperes for the entire duration of the charging session. The fourth charging profile is defined to provide 450 Amperes for the first 10 minutes and a derated current of 400 Amperes for the remaining duration of the charging session. The fifth charging profile is defined to provide 500 Amperes for the first 10 minutes and 400 Amperes for the remaining duration of the charging session. Derating includes operation below the maximum power rating, current rating, or voltage rating in order to prolong battery life.

TABLE 1

|        | First Profile | Second Profile | Third Profile | Fourth Profile | Fifth Profile |
|--------|---------------|----------------|---------------|----------------|---------------|
| 10 min | 34.5          | 37.4           | 40.3          | 42.8           | 43.1          |
| 20 min | 51.6          | 56.2           | 56.4          | 55.9           | 55.4          |
| 30 min | 67.8          | 68.3           | 68.1          | 67.8           | 67.3          |

Based on Table 1 above, if a vehicle 12 was charging for ten minutes, the controller C may select the fifth charging profile (which has the highest energy value in the ten-minute category) to maximize the energy gained. If the vehicle 12 was charging for a total of twenty minutes, the controller C may select the third charging profile (which has the highest energy value in the twenty-minute category) to maximize the energy gained. Similarly, if the vehicle 12 was charging for a total of thirty minutes, the controller C may select the second charging profile (which has the highest energy value in the thirty-minute category) to maximize the energy gained. It is understood that the ranges listed above are just examples and may be varied based on the application at hand.

In another embodiment, the controller C may be adapted to compare the time taken for the rechargeable energy storage unit to reach various charge states for each of the plurality of charging profiles. For example, the various charge states may include a first charge state of 80% SOC, a second charge state of 90% SOC and a third charge state of 96% SOC. The state of charge (SOC) refers to the stored charge available to do work relative to that which is available after the rechargeable energy storage unit 14 has been fully charged and may be viewed as an assessment of the potential energy of the rechargeable energy storage unit 14. Based on the session goal selected, the controller C may select the charging profile that charges to the desired SOC in the least amount of time.

The recommended charging profile may include pre-defined location-based settings. In one example, a fixed setting is placed to charge for 10 minutes at a charging station 42 on the way home from work for a user. In another example, a fixed setting is placed to add 150 miles at a specific charging station 42 to complete a trip to a weekend cottage. Each of the charging profiles may be separately calibrated in order to optimize the energy demand for the selected session goal.

Figure 3:
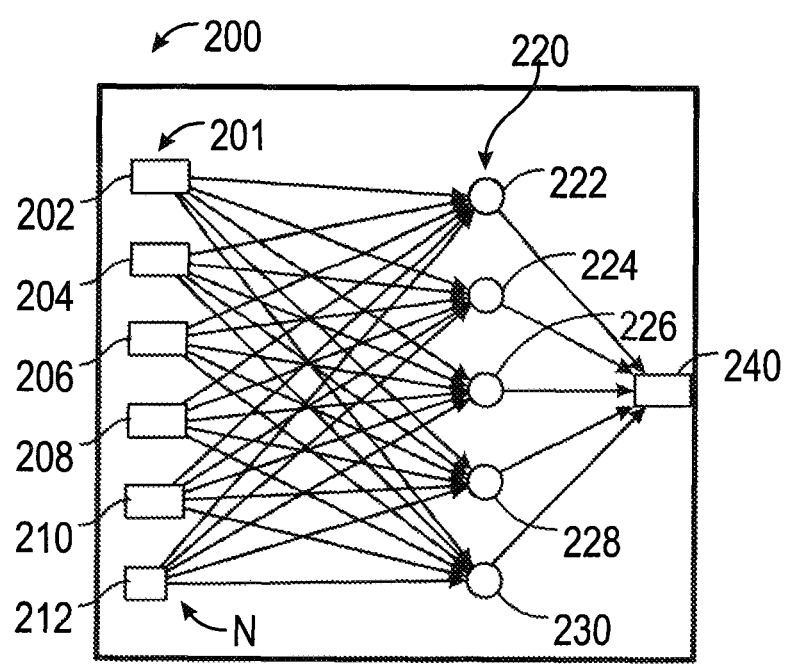
FIG. 3 is a schematic example of a neural network employable by the controller of FIG. 1.

In some embodiments, the controller C of FIG. 1 may incorporate a machine learning module (such as neural network 200 shown in FIG. 3) to execute portions of the method 100, e.g., generate the recommended charging profile. Referring to FIG. 3, the neural network 200 may be a feedforward artificial neural network having at least three layers, including an input layer 201, at least one hidden layer 220 and an output layer 240. Each layer is composed of respective nodes N configured to perform an affine transformation of a linear sum of inputs. The respective nodes N are characterized by a respective bias and respective weighted links. The parameters of each respective node N may be independent of others, i.e., characterized by a unique set of weights.

The respective nodes N in the input layer 201 receive the input, normalize them and forward them to respective nodes N in the hidden layer 220. The respective nodes N in the input layer 201 may represent various station parameters and the session goals(s). For example, the input layer 201 may include first input node 202, second input node 204, third input node 206, fourth input node 208, fifth input node 210 and sixth input node 212 respectively representing usage volume at the charging station 42, costs incurred at the charging station 42, the presence of brown-out conditions at the charging station 42, and the percentages selected of the first session goal 52, the second session goal 54 and the third session goal 56.

Referring to FIG. 3, the hidden layer 220 may include first hidden node 222, second hidden node 224, third hidden node 226, fourth hidden node 228 and fifth hidden node 230. Each respective node N in a subsequent layer computes a linear combination of the outputs of the previous layer. A network with three layers would form an activation function $f(x)=f(3)(f(2)(f(1)(x)))$. The activation function f may be linear for the respective nodes N in the output layer 240. The activation function f may be a sigmoid for the hidden layer 220. A linear combination of sigmoids may be used to approximate a continuous function characterizing the output vector y. The patterns recognized by the neural network 200 may be translated or converted into numerical form and embedded in vectors or matrices.

In summary, the system 10 (via execution of method 100) provides multiple charging profiles optimized for different goals, such as charge time available, desired range to be added and/or cost minimization.

The controller C of FIG. 1 may be an integral portion of, or a separate module operatively connected to, other controllers of the vehicle 12. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for optimizing charging for a vehicle having a rechargeable energy storage unit and travelling on a route, the system comprising:
   a controller having a processor and tangible, non-transitory memory on which instructions are recorded, execution of the instructions by the processor causing the controller to:
      obtain details of the route, including surveying local charging infrastructure to determine availability of one or more charging stations within a predefined radius of the route;
      obtain respective station parameters pertaining to the one or more charging stations;
      present a user with one or more session goals, including a first session goal of minimizing cost, a second session goal of minimizing charging time to full capacity, and a third session goal of a maximum range added within a predefined time limit;
      prompt the user to select a respective percentage for each of the one or more sessions goals;
      generate a recommended charging profile for one or more stops respectively along the route, based in part on the respective percentage selected by the user for the one or more session goals and the respective station parameters; and
      control operation of the vehicle based in part on the recommended charging profile.

2. The system of claim 1, wherein the respective station parameters include usage volume and costs incurred at the one or more charging stations.

3. The system of claim 2, wherein:
   the recommended charging profile is chosen from a plurality of charging profiles; and
   the controller is adapted to compare respective energy gained by the rechargeable energy storage unit during various charging periods of the plurality of charging profiles.

4. The system of claim 3, wherein the various charging periods include a first charging period of 10 minutes, a second charging period of 20 minutes and a third charging period of 30 minutes.

5. The system of claim 2, wherein:
   the recommended charging profile is chosen from a plurality of charging profiles; and
   the controller is adapted to compare respective time taken for a rechargeable energy storage unit in the vehicle to reach various charge states for the plurality of charging profiles.

6. The system of claim 5, wherein the various charge states include a first charge state of 80% SOC, a second charge state of 90% SOC and a third charge state of 96% SOC.

7. The system of claim 1, wherein the respective station parameters include presence of brown-out conditions at the one or more charging stations.

8. The system of claim 1, wherein the controller executes a machine learning module to generate the recommended charging profile.

9. The system of claim 1, wherein the controller is configured to continuously monitor the local charging infrastructure to update the recommended charging profile while the vehicle is on the route.

10. The system of claim 1, wherein the recommended charging profile is chosen from a plurality of charging profiles, including a first charging profile, a second charging profile and a third charging profile defined to respectively provide 300 Amperes, 350 Amperes and 400 Amperes for an entire duration of the charging session.

11. The system of claim 10, wherein the plurality of charging profiles, includes a fourth charging profile defined to provide 450 Amperes for a first portion of the charging session and a derated current of 400 Amperes for a remaining duration of the charging session, and a fifth charging profile defined to provide 500 Amperes for the first portion of the charging session and 400 Amperes for the remaining duration of the charging session.

12. A method for optimizing charging for a vehicle having a rechargeable energy storage unit and travelling on a route, the vehicle having a controller with a processor and tangible, non-transitory memory, the method comprising:

obtaining details of the route, including surveying local charging infrastructure to determine availability of one or more charging stations within a predefined radius of the route, via the controller;

obtaining respective station parameters pertaining to the one or more charging stations, via the controller;

presenting a user with one or more session goals, including a first session goal of minimizing cost, a second session goal of minimizing charging time to full capacity, and a third session goal of a maximum range added within a predefined time limit, via the controller;

prompting the user to select a respective percentage for each of the one or more sessions goals;

generating a recommended charging profile for one or more stops respectively along the route, based in part on the respective percentage selected by the user for the one or more session goals and the respective station parameters, via the controller; and controlling operation of the vehicle based in part on the recommended charging profile.

13. The method of claim 12, further comprising:
incorporating costs incurred, usage volume and presence of brown-out conditions at the one or more charging stations as the respective station parameters.

14. The method of claim 12, further comprising:
continuously monitor the local charging infrastructure to update the recommended charging profile while the vehicle is on the route, via the controller.

15. The method of claim 12, further comprising:
selecting the recommended charging profile from a plurality of charging profiles and comparing respective energy gained by the rechargeable energy storage unit during various charging periods of the plurality of charging profiles, via the controller.

16. The method of claim 15, wherein the various charging periods include a first charging period of 10 minutes, a second charging period of 20 minutes and a third charging period of 30 minutes, via the controller.

17. The method of claim 12, further comprising:
selecting the recommended charging profile from a plurality of charging profiles and comparing respective time taken for a rechargeable energy storage unit in the vehicle to reach various charge states for the plurality of charging profiles, via the controller.

18. The method of claim 17, wherein the various charge states include a first charge state of 80% SOC, a second charge state of 90% SOC and a third charge state of 96% SOC, via the controller.

19. The method of claim 12, further comprising:
selecting the recommended charging profile from a plurality of charging profiles, including a first charging profile, a second charging profile and a third charging profile defined to respectively provide 300 Amperes, 350 Amperes and 400 Amperes for an entire duration of the charging session.

20. The method of claim 19, further comprising:
including a fourth charging profile and a fifth charging profile in the plurality of charging profiles, the fourth charging profile being defined to provide 450 Amperes for a first portion of the charging session and a derated current of 400 Amperes for a remaining duration of the charging session, the fifth charging profile being defined to provide 500 Amperes for the first portion of the charging session and 400 Amperes for the remaining duration of the charging session.

* * * * *